United States Patent
Schiwek

Patent Number: 6,017,452
Date of Patent: Jan. 25, 2000

[54] OIL RETENTION BARRIER WITH ANTI-SPLASHING MEANS

[76] Inventor: Helmut Schiwek, Am Waldessaum 3, Duisburg, Germany, D-47057

[21] Appl. No.: 08/981,725
[22] PCT Filed: Jun. 20, 1996
[86] PCT No.: PCT/DE96/01086
§ 371 Date: Feb. 10, 1998
§ 102(e) Date: Feb. 10, 1998
[87] PCT Pub. No.: WO97/01004
PCT Pub. Date: Jan. 9, 1997

[30] Foreign Application Priority Data

Jun. 23, 1995 [DE] Germany .......................... 195 22 532

[51] Int. Cl.⁷ ..................................................... E02B 15/04
[52] U.S. Cl. .......................... 210/242.4; 210/924; 405/63
[58] Field of Search ............................. 210/242.4, 924; 405/63, 72

[56] References Cited

U.S. PATENT DOCUMENTS

| | | | |
|---|---|---|---|
| 3,590,584 | 7/1971 | Fitzgerald et al. | 61/1 |
| 3,744,254 | 7/1973 | Fennelly | 61/1 |
| 4,174,185 | 11/1979 | Toki | 405/63 |
| 4,610,794 | 9/1986 | Tsahalis | 210/776 |
| 5,265,976 | 11/1993 | Russell | 405/63 |

FOREIGN PATENT DOCUMENTS

| | | |
|---|---|---|
| 43 25 806 | 7/1994 | Germany . |
| 60-175615 | 9/1985 | Japan . |
| 2 045 172 | 10/1980 | United Kingdom . |

*Primary Examiner*—Ivars Cintins
*Attorney, Agent, or Firm*—James Creighton Wray; Meera P. Narasimhan

[57] ABSTRACT

An oil retention barrier (1) over which oil cannot splash over when the barrier is hauled in consists of several floating partial cells (8, 15, 16) and several smaller partial cells (7, 21) that are submerged in water, arranged and joined together in such a way that a flow channel (24) is created therebetween. For that purpose, one of the partial cells (15) is positioned in front of the other floating partial cells (8, 16) and joined to the floating partial cell (8) and to the submerged partial cell (9) by spacers (18, 23) that create said flow channel (24). The floating partial cells (8, 15, 16) are filled with waterproofed glass fibers or glass fiber mats, whereas the submerged partial cells (9, 21, 26) are filled with a non waterproofed material, in particular glass fibers. The flow channel (24) prevents banking-up pressure from building up in front of the barrier (1), so that the latter can be hauled in with practically no problems. The oil (4) cannot splash over the barrier nor flow underneath it.

16 Claims, 3 Drawing Sheets

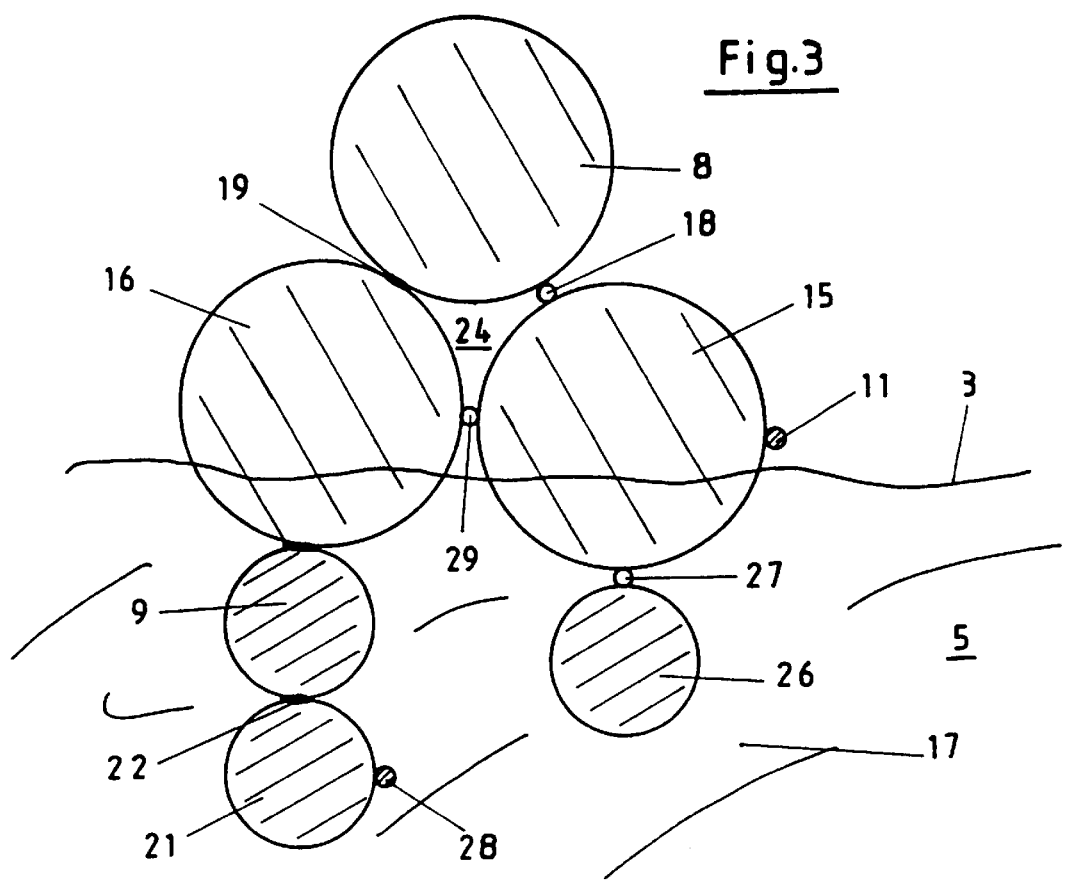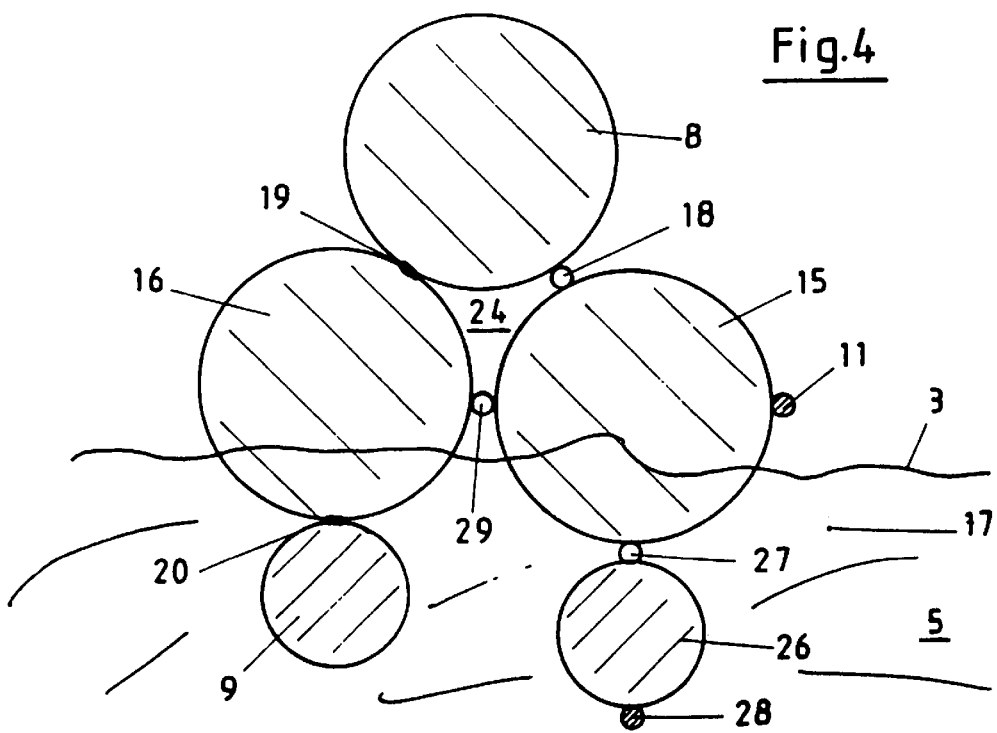

OIL RETENTION BARRIER WITH ANTI-SPLASHING MEANS

This application is a 371 of PCT/DE96/01086, filed Jun. 20, 1996.

BACKGROUND OF THE INVENTION

The invention involves a floating oil barrier for the purpose of containing oil or similar materials in water. It is comprised of larger floating partial cells and are made of waterproof materials. Smaller partial cells that are submerged in the water are made of untreated or hydrophilic materials, producing stabilizing effects of the barrier's position, wherein the partial cells are comprised of glass fibers or glass fiber mats and a flexible tube that encases them. They are joined to one another via a traction cable.

With larger oil tanker vessels being developed, environmental danger posed by maritime oil spills is also continuously increasing. In recent years, oil disasters have resulted in entire coastlines becoming severely polluted and marine life in the endangered areas being destroyed to such an extent that these large ships are being burdened with greater and greater charges. For this reason, efforts have been made to build multiband tankers, in an attempt to make it more difficult for oil spills to occur. In the end, however, in addition to the associated production problems, such measures cannot prevent oil from escaping if a ship sinks. One method, known in the art from FR-PS 2 646 189, calls for waterproofed mineral fibers to be blown onto the surface of the water. The oil is supposed to settle onto these fibers, so that the bulk can then be picked up as a whole and disposed of. The fibers are waterproofed with silicone oil, and, because they are short, can be hindered from sinking. Contamination and pollution of the sea bed is thus such a problem that mineral fibers of this type are not used. In another method, known in the art from GB-PS 1 235 463, oil on top of the water is to be adsorbed onto inorganic fibers, with the fibers being treated beforehand with a water-repellent material. As a result, the fibers float on top of the oil and cause the oil to settle on them; the oil is then removed by burning off the fibers. The burning off of the oil adsorbed by the fibers is not economically feasible and causes considerable environmental damage. In addition, too little space is available for storage of the fibers, which are simply to be sprayed onto the water. DE-PS 41 40 247 contains the recommendation that waterproofed glass wool materials be joined together to form a barrier, with the glass fibers being inserted into a perforated flexible tube. The oil can enter the tube through the perforations, thus entering the glass wool where the oil is adequately adsorbed and held until the barrier can be removed from the water and disposed of. The disadvantage of this method is that the oil adsorber, or the barrier, floats on the surface of the water. When waves hit the barrier, the oil cannot be kept from splashing back out. Accordingly, DE-OS 43 01 761 or DE-OS 43 25 806 recommends that a multisection oil adsorber be employed, in which one cell is coated with waterproofed material and the others, which lie below this one, are coated with non-waterproofed material. The upper partial cell, coated with waterproofed glass fiber material, floats on top of the water and can absorb oil, while the lower, or several lower, partial cells are submerged in the water, as they more or less attract the water due to their particular formation. They act as a kind of centerboard that effectively prevents the oil from flowing through when waves hit the barrier. Integrated into the joined partial cells is a traction cable, via which the barrier can be maneuvered. In particular, this makes it possible to pull the barrier, which borders a correspondingly large oil slick, back to the ship, thereby continuously skimming off the oil floating on the water or binding this oil using suitable glass fiber mats. Under strong winds, however, when this type of oil barrier is hauled in, it too cannot stop the collected oil from splashing over the barrier and then back into the unprotected marine area, that is, onto the surface of the water. To some extent, eddies also form, which in the end even lead to the oil being pushed under the centerboard, and from there into the oil-free section of the water.

It is thus the object of the invention to create an oil barrier which, in strong winds and especially when it is being hauled in, will prevent the oily water from spilling, and thereby will also prevent the oil from passing below the centerboard.

SUMMARY OF THE INVENTION

The object is attained in accordance with the invention in that one of the larger, floating partial cells is positioned in front of the other larger partial cells and in front of the smaller, submerged partial cells, on the side of the contaminated water; it is fastened to the traction cable and is connected via spacers, which create a flow channel, to the floating and submerged partial cells.

This special design thus produces a conduit within the barrier, via which the flow that is created when the barrier is being hauled in is effectively diverted. The flow is more or less redirected within the circle, in other words, the pressure is reduced by the oil-contaminated water, or even the pure oil, being returned via the forward positioned partial cell into the area of the contaminated water. In this manner the pressure is reduced, making it possible, without problems, to haul in such an oil barrier, for example, from the land or from a salvage vessel where the oil can be siphoned or, as mentioned above, removed using applied glass fiber mats, making a recovery of the oil possible. What is surprising here is that not only can the oil be prevented from splashing out, the oil can also be prevented from passing below the barrier. At the same time, this method causes the dynamic pressure to be reduced or completely eliminated, so that the entire process of hauling the oil barrier in is made easier. This manifold effect facilitates to a great extent the handling of the oil barrier, wherein the waterproofed partial cells, as before, absorb oil without difficulty, effectively improving their buoyancy.

In accordance with one advantageous embodiment of the invention, two floating partial cells and two submerged partial cells are connected to one another forming a seal against the oil, and more or less forming a strip, with the forward-positioned partial cell that is coupled to the traction cable being connected to the upper, floating partial cell and the upper, submerged partial cell via spacers. The two submerged partial cells, which are arranged one on top of the other below the two floating partial cells, again form the keel or the centerboard, which prevents any underseepage and effectively enables the flow channel to act as a discharge channel. In this way, the entire oil barrier can be hauled in via the traction cable, which is connected to the forward-positioned, floating partial cell. This serves to ensure an even movement, wherein the centerboard, which is formed by the two submerged partial cells and extends downward in the water, as a result of its properties, ensures the positioning stability of the "strip"

A further improvement on the invention provides for the traction cable to be fastened to the forward-positioned partial cell, on the side of the contaminated water. As mentioned above, this positioning of the traction cable contributes to ensuring that the oil channel formed between the individual partial cells also remains open and unobstructed.

In order to ensure that the centerboard, which is formed by the two submerged partial cells, also remains effective, it is advantageous for the lower submerged partial cell to also be connected to the forward-positioned partial cell via an extended guy line. The forward-positioned partial cell, to which the traction cable is fastened, thus draws the centerboard, which is formed by the two submerged partial cells, along, wherein the guy line contributes to ensuring that the distance between the two types of partial cells is continuously maintained. This particular arrangement forms a funnel-shaped inlet for the flow channel, thus ensuring its effectiveness.

Experiments have shown that a particularly effective barrier is one in which the diameter of the floating partial cells measures 100–300 mm, preferably 150 mm, and the diameter of the submerged partial cells measures 50–150 mm, preferably 75 mm. This will result in a barrier that is adequately large in terms of volume or diameter, which is sufficient in average-sized oil spills to prevent the oil from splashing out. At the same time, the hauling in of the oil barrier via the traction cable is ensured.

A further embodiment of the invention provides for an additional submerged partial cell to be connected via spacers to the forward-positioned partial cell, and for an additional traction cable to be attached to the lower submerged partial cell, which, like the upper submerged partial cell above it, is not connected to the forward-positioned partial cell. This design results in a definite improvement on the positional stability of the forward-positioned floating partial cell, since the corresponding "heavy" additional submerged partial cell is responsible for ensuring this. Because this additional partial cell is connected via a spacer to the floating, forward-positioned partial cell, the oil can be removed here and routed into the flow channel, while the additional traction cable on the rear-positioned barrier section of the two submerged partial cells ensures the effectiveness of the centerboard, which will be described in greater detail below. On the whole, this design also offers the necessary assurance that the oil or the water-oil mixture that is being forced upward as a result of the dynamic pressure can be advantageously removed, under reduced pressure, via the flow channel.

The direction of movement for the floating oil, determined by the flow channel, is promoted even further, in accordance with a further improvement on the invention, if at least the forward-positioned, floating partial cell is round in its cross-section. An oval cross-section is also possible, in which case the forward-positioned, floating partial cell should preferably be positioned with its flatter side on the water. What is important here is that the oil should be siphoned or introduced into and through the flow channel more or less in one specific direction, in order to prevent the disadvantageous dynamic pressure.

Finally, it is also possible for the upper and the lower floating partial cells to be connected to the forward-positioned partial cell via spacers, with each being coupled to a submerged partial cell. The two submerged partial cells provide a stabilizing effect, wherein the submerged partial cell assigned to the forward-positioned, floating partial cell is coupled to it via a spacer, in order to form part of the flow channel, as in the embodiment described above.

The embodiment of the oil barrier described here can be further optimized if the submerged partial cell that is connected to the forward-positioned partial cell via a spacer is coupled to an additional traction cable. This traction cable serves to support the uniform movement of the entire oil barrier, wherein the substantial flow of oil is routed between the forward-positioned partial cell and the submerged, rear-positioned partial cells.

For reasons of waste disposal engineering, but also in order to permit a correspondingly high level of tractive force to be absorbed, it is advantageous for the traction cable and the supplementary traction cable to be comprised of glass fiber lines. These traction cables comprised of glass fiber lines can be disposed of along with the entire oil barrier, for example, after the oil that is contained in the barrier, or has been absorbed by it, has been forced out via a press. This remaining glass fibers mass can then be placed in a furnace in order to aid the flame, with the resulting ashes, in principle, being nothing but sand.

The invention is characterized particularly in that an oil barrier is created which, due to its particular design, is capable of ensuring that the oil barrier can be used over and over to siphon off oil, and is held in a stable position by the assigned partial cells that are comprised of non waterproofed material. This oil barrier, comprised of several partial cells, when it is full of siphoned oil, prevents the oil from splashing out when the oil barrier is being hauled in, or under heavy winds, in that the oil barrier, comprised of several partial cells, is provided with a flow channel, through which the oil-contaminated water is routed back to the contaminated water area, more or less within the circle. In this manner, dynamic pressure can be prevented, while the oil is prevented from splashing over the barrier. At the same time, this serves to make the hauling in of the oil barrier substantially easier.

Further detailed characteristics and advantages of the object of the invention are contained in the following description of the attached diagrams, in which preferred exemplary embodiments are illustrated with the necessary details and individual components. These show:

BRIEF DESCRIPTION OF THE DRAWINGS

FIG. 3: a further design for the barrier, in cross-section, and FIG. 4: a third embodiment of the barrier, in cross-section.

DETAILED DESCRIPTION OF THE PREFERRED EMBODIMENT

Figure 1:
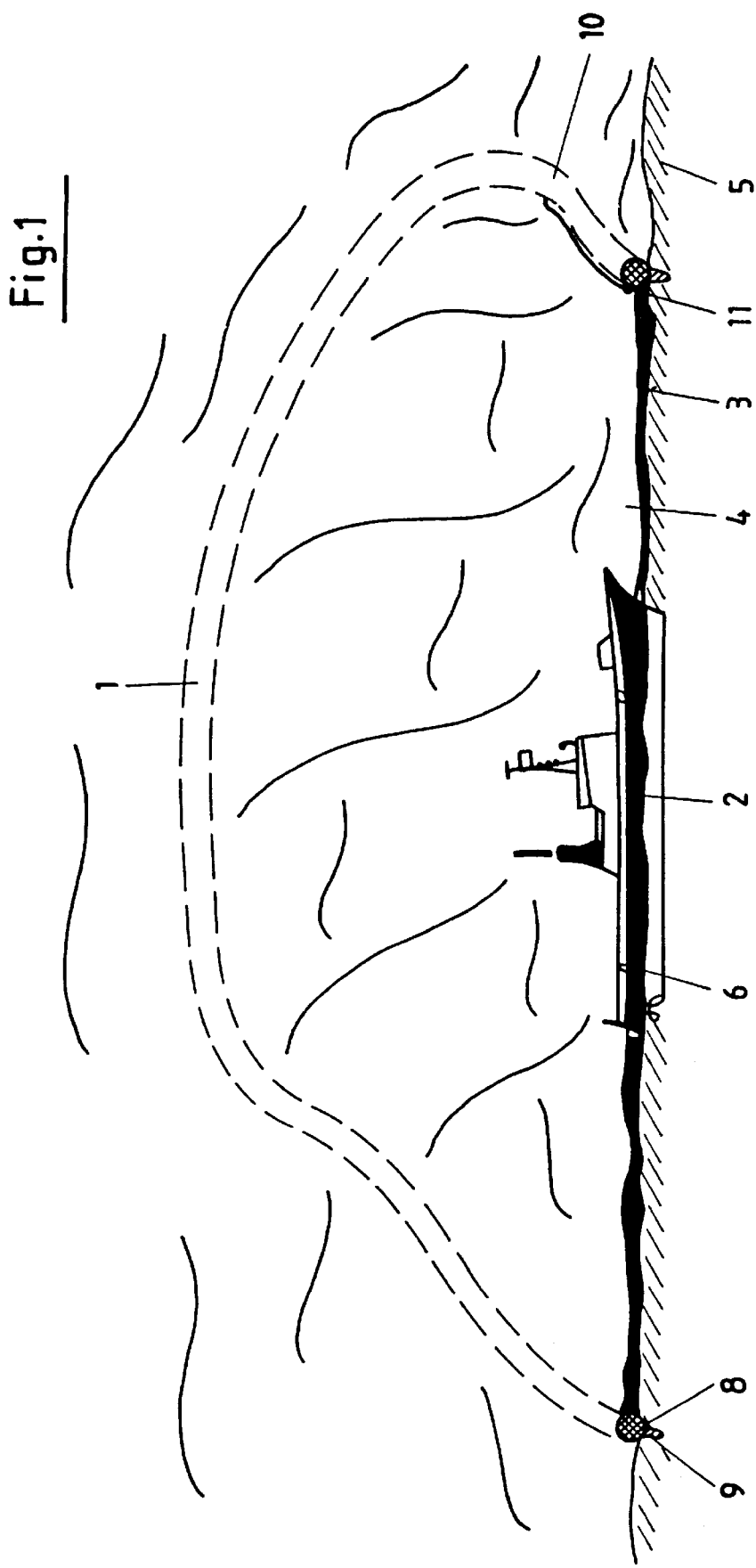
FIG. 1: a surveillance or salvage vessel that is floating on the water, separating the clean water from water that is contaminated with oil.

FIG. 1 shows an area of water that is partially polluted by oil. The contaminated water is separated from the water that is still clean by the oil barrier 1. The surveillance or salvage vessel 2 is floating here in the contaminated area, for example, in order to remove and dispose of the oil 4.

The surface of the water is indicated by the number 3 and, as mentioned above, is divided into clean and contaminated areas, although this may also refer to salt water or fresh water 5.

A hauling device connected to the surveillance ship 2 and used to haul the barrier 1 in is indicated by the number 6. This is accomplished via the barrier's 1 traction cable 11, which is correspondingly connected to the individual partial cells of the oil barrier.

In the design of the invention illustrated in FIG. 1, only one floating partial cell 8 and one submerged partial cell 9 can be seen, with the submerged partial cell 9 serving as a kind of centerboard while also providing the oil barrier 1 with stability of position. At the same time, this submerged partial cell 9, or the corresponding centerboard, serves to prevent the oil 4 from seeping out underneath.

The individual partial cells 8, 9 are encased by a flexible tube 10, which is not illustrated here in any further detail. They are filled with glass fibers, with the floating partial cells being filled with waterproofed glass fibers and the submerged partial cells being filled with non waterproofed glass fibers. Suitable glass fiber mats may also be used here in place of the glass fibers. What is advantageous here is that the oil, or in the case of the non waterproofed partial cells 9, the water, will settle on the fibers, so that an effective adsorption, particularly of the oil or the oil-contaminated materials, is ensured.

Figure 2:
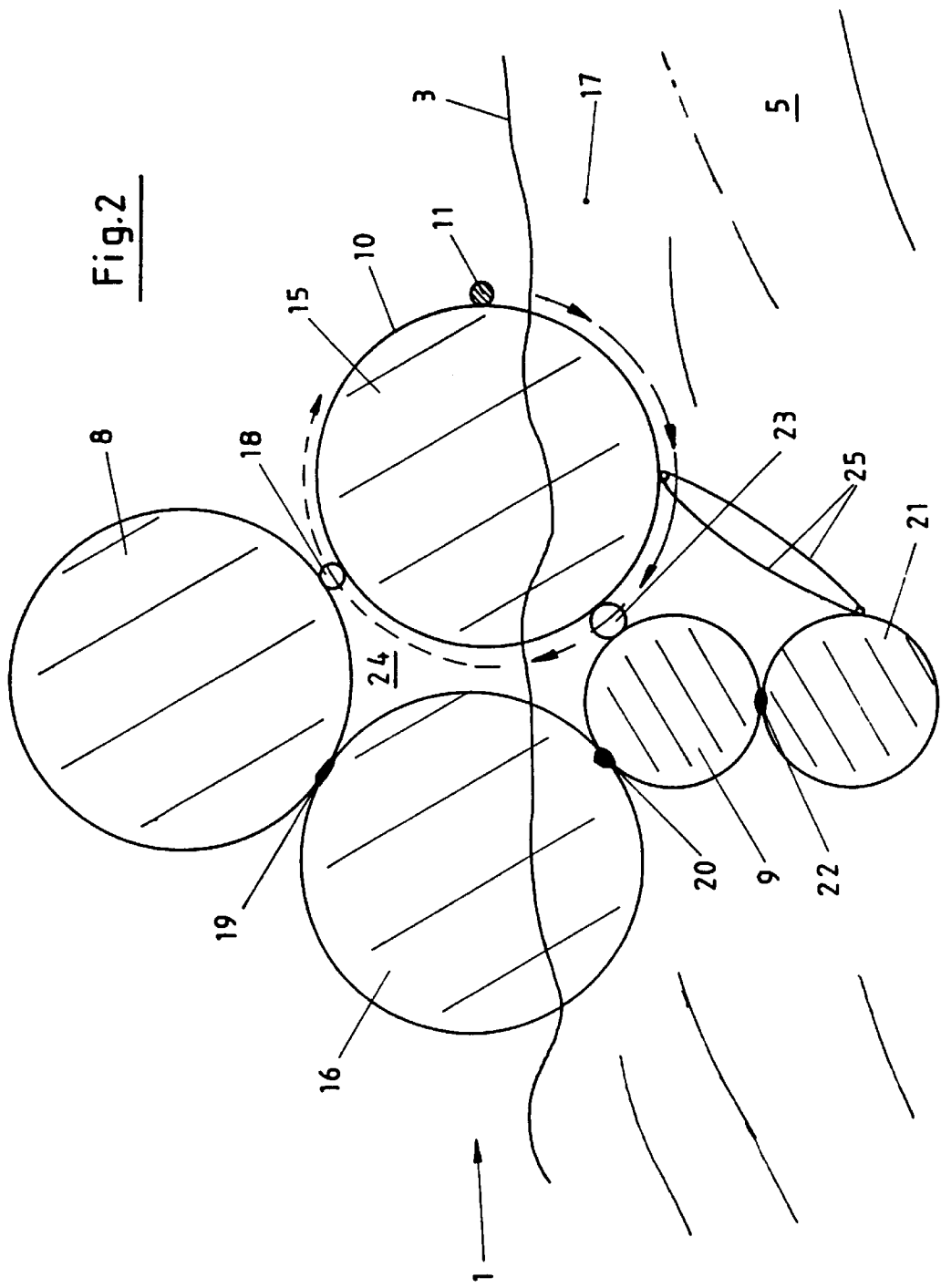
FIG. 2: a cross-section of the barrier, comprised of several cell sections.

FIG. 2 shows a cross-section of the oil barrier specified in the invention. It is clearly recognizable that this design contains a total of 3 floating partial cells 8, 15, 16. These floating partial cells 8, 15, 16 are connected to submerged partial cells, that is, partial cells that are filled with a non waterproofed material, 9, 21. The partial cells 8, 9, 16, 21 are connected to one another via connectors 19, 20, 22 such that a seal is formed against the oil, while the partial cells 8, 15 and 9, 15 are connected to one another via spacers 18, 23 on the side of the industrial water source 17, such that a flow channel 24 is formed between them. The oil 4 or the oil-contaminated water passes through this flow channel in the direction indicated by the arrow, such that pressure can build up in this area. In this manner, the oil 4 or the oil-contaminated water is prevented from splashing over the entire barrier 1, and the flow channel 24 obtains a definite funnel-shaped opening, since the lower, submerged partial cell 21 is connected via a guy line 25 to the forward-positioned, floating partial cell 15.

The above-mentioned dynamic pressure could be created if the barrier 1 were drawn via the traction cable 11 toward the contaminated water 17, that is, in the direction of the surveillance vessel 2, which is not illustrated here. The illustration in FIG. 2 makes it quite clear that such problems cannot occur here and that the prevention of any dynamic pressure facilitates the entire movement of the barrier.

FIG. 3 and FIG. 4 illustrate embodiments in which the design of the flow channel 24 is varied somewhat, via a different positioning of submerged partial cells 9, 21, or 26. Here, in addition to the connection via a spacer 18, the second floating partial cell 16 is connected to the forward-positioned, floating partial cell 15 via a spacer 29, thus achieving a precise positioning of the flow channel. Further, the other submerged partial cell 26 is connected to the forward-positioned, floating partial cell 15 via a spacer 29, thus ensuring proper direction of the oil when the dynamic pressure is created.

In addition, in both FIG. 3 and FIG. 4, an additional traction cable 28 is provided, which is attached either to the protruding centerboard 13, 9, and 21 or to the other submerged partial cell 26.

All above-named characteristics, including those that are found only in the diagrams, are considered essential features of the invention, both solely and in combination.

I claim:

1. An oil barrier for containing material comprising first and second sets of cells, the first set of cells comprising floating partial cells floating above water, the floating cells being hydrophobic, the second set of cells comprising submerged partial cells submerged under water, the submerged cells being hydrophilic for stabilizing the barrier, wherein the partial cells comprise glass fibers or glass fiber mats, a flexible tube encasing the partial cells, a traction cable connected to at least one floating partial cell, spacers connecting the at least one floating partial cell to another floating partial cell and to at least one submerged partial cell, a flow channel formed along the floating and submerged partial cells connected by the spacers.

2. The oil barrier of claim 1, further comprising a strip seal formed by at least two floating partial cells and at least two submerged partial cells connected to each other for containing the material.

3. The oil barrier of claim 1, wherein the at least one floating partial cell coupled to the traction cable is proximal the material to be contained and is connected to the another floating partial cell and the at least one submerged partial cell.

4. The oil barrier of claim 2, wherein the traction cable is attached to one of the two floating partial cells positioned facing the material to be contained.

5. The oil barrier of claim 1, further comprising an extendible guy line connecting the at least one floating partial cell to another submerged partial cell.

6. The oil barrier of claim 1, wherein the floating partial cells have a diameter in a range of about 100–300 mm.

7. The oil barrier of claim 6, wherein the floating partial cells have a diameter of about 150 mm.

8. The oil barrier of claim 1, wherein the submerged partial cells have a diameter in a range of about 50–150 mm.

9. The oil barrier of claim 8, wherein the submerged cells have a diameter of about 75 mm.

10. The oil barrier of claim 1, wherein another submerged partial cell is connected to the at least one floating cell.

11. The oil barrier of claim 10, further comprising a supplementary traction cable attached to the another submerged partial cell wherein the another submerged partial cell is not connected to adjacent submerged partial cells.

12. The oil barrier of claim 1, wherein the at least one floating partial cell has a circular cross-section.

13. The oil barrier of claim 1, wherein the at least one floating partial cell has an oval cross-section and is suspended with a flat side on a surface of water.

14. The oil barrier of claim 1, wherein each of the floating partial cells is connected to the at least one floating partial cell, and wherein each of the floating partial cells is connected to at least one of the submerged partial cells by the spacers.

15. The oil barrier of claim 1, wherein the at least one submerged partial cell connected to the at least one floating partial cell is coupled to a supplementary traction cable.

16. The oil barrier 15, wherein each of the traction cable and the supplementary traction cable comprises glass fiber lines.

* * * * *